(12) United States Patent
Zünd et al.

(10) Patent No.: US 9,324,161 B2
(45) Date of Patent: Apr. 26, 2016

(54) CONTENT-AWARE IMAGE COMPRESSION METHOD

(71) Applicant: DISNEY ENTERPRISES, INC., Burbank, CA (US)

(72) Inventors: Fabio Zünd, Zurich (CH); Yael Pritch, Zurich (CH); Alexander Sorkine Hornung, Zurich (CH); Thomas Gross, Zurich (CH)

(73) Assignee: DISNEY ENTERPRISES, INC., Burbank, CA (US)

( * ) Notice: Subject to any disclaimer, the term of this patent is extended or adjusted under 35 U.S.C. 154(b) by 55 days.

(21) Appl. No.: 13/802,165

(22) Filed: Mar. 13, 2013

(65) Prior Publication Data

US 2014/0270553 A1 Sep. 18, 2014

(51) Int. Cl.

| | |
|---|---|
| *G06K 9/32* | (2006.01) |
| *G06K 9/36* | (2006.01) |
| *G06K 9/46* | (2006.01) |
| *G06T 9/00* | (2006.01) |
| *H04N 19/61* | (2014.01) |
| *H04N 19/132* | (2014.01) |
| *H04N 19/14* | (2014.01) |
| *H04N 19/59* | (2014.01) |

(52) U.S. Cl.
CPC ............... *G06T 9/00* (2013.01); *H04N 19/132* (2014.11); *H04N 19/14* (2014.11); *H04N 19/59* (2014.11); *H04N 19/61* (2014.11)

(58) Field of Classification Search
CPC ........................................................ G06T 9/00
USPC .................... 382/233, 300; 345/609, 668–671
See application file for complete search history.

(56) References Cited

U.S. PATENT DOCUMENTS

| | | | |
|---|---|---|---|
| 6,563,964 B1* | 5/2003 | Hallberg | 382/299 |
| 2007/0140569 A1* | 6/2007 | Tabuchi et al. | 382/232 |
| 2009/0252425 A1* | 10/2009 | Bruls et al. | 382/232 |
| 2011/0069224 A1* | 3/2011 | Gross et al. | 348/441 |
| 2013/0050574 A1* | 2/2013 | Lu et al. | 348/441 |
| 2013/0272391 A1* | 10/2013 | Zheng et al. | 375/240.03 |
| 2014/0010294 A1* | 1/2014 | Ye et al. | 375/240.12 |

OTHER PUBLICATIONS

Zhu et al. ("Saliency-based Adaptive Scaling for Image Retargeting," IEEE 7th Int'l Conference on Computational Intelligence and Security, 2011, pp. 1201-1205).*

Dong et al. ("Optimized image resizing using seam carving and scaling," ACM Transactions on Graphics, vol. 28, No. 5, Dec. 2009, pp. 125:1-125:10).*

(Continued)

*Primary Examiner* — Yubin Hung
(74) *Attorney, Agent, or Firm* — Sheppard Mullin Richter & Hampton LLP (57) ABSTRACT

Methods for content-aware image compression are disclosed. One method comprises the steps of non-uniformly downscaling an original input image according to a saliency map, creating a residual image, encoding the residual image and downscaled input image, and transmitting the residual image and downscaled input image. The encoded image components are transmitted to a receiver. Downscaling may be performed using an aspect ratio that is automatically calculated from the saliency map. The saliency map may be based on an algorithm specified at an encoder or on regions of interest selected by a plurality of users of receivers that receive the transmitted encoded image components.

22 Claims, 6 Drawing Sheets

(56) References Cited

OTHER PUBLICATIONS

L. Itti, "Automatic Foveation for Video Compression Using a Neurobiological Model of Visual Attention", IEEE Transactions on Image Processing, Oct. 2004, pp. 1304-1318, 13(10).
D. Panozzo et al., "Robust Interactive Image Retargeting via Axis-Aligned Deformation", Eurographics 2012, pp. 1-8, 31(2).
M. Rubinstein et al., "Improved Seam Carving for Video Retargeting", ACM Transactions on Graphics, 2010, pp. 1-9, 29(5).
P. Burt et al., "The Laplacian Pyramid as a Compact Image Code", IEEE Transactions on Communications, Apr. 1983, pp. 532-540, 31(4).
F. Perazzi et al., "Saliency filters: Contrast Based Filtering for Salient Region Detection", CVPR, 2012, pp. 733-740.
F. Zund et al., "Content-Aware Compression using Saliency-Driven Image Retargeting for Wireless Video", Submitted to ACM Multimedia 2012.

* cited by examiner

CONTENT-AWARE IMAGE COMPRESSION METHOD

TECHNICAL FIELD

The present disclosure relates generally to image compression techniques, and more particularly, some embodiments relate to methods for content-aware image compression using non-uniform saliency-driven image scaling.

DESCRIPTION OF THE RELATED ART

With the growing distribution of high quality and live video content, streaming service and mobile device hardware has kept pace with increasing computational power. The critical bottleneck to displaying video content in high quality on mobile devices remains the limited wireless channel capacity available per mobile device. This is especially the case when streaming high definition video to numerous mobile devices over a cellular network. High compression, high image quality codecs have been developed to address this issue. Among the developed codecs are region-of-interest (ROI) based codecs that prioritize specific regions in an image during compression.

BRIEF SUMMARY OF THE DISCLOSURE

According to various embodiments of the disclosed method, content-aware compression using saliency driven image retargeting (CCSIR) is used to integrate saliency maps into a compression pipeline. In one embodiment, an encoder performs the steps of non-uniformly downscaling an original input image according to a saliency map, creating a residual image, encoding the residual image and downscaled input image, and transmitting the encoded residual image and encoded downscaled input image.

In one embodiment, non-uniformly downscaling the original input image comprises the steps of overlaying a grid over the image, computing an axis-aligned deformed grid of the image based on the saliency map, and performing a bicubic interpolation on the image based on the grid coordinates. In another embodiment, downscaling is performed using an aspect ratio that is automatically calculated from the saliency map.

In one embodiment, the saliency map is based on an algorithm specified at an encoder. In another embodiment, the saliency map is based on a non-rectangular, arbitrary region of interest in the original input image. In yet another embodiment, the saliency map is calculated by taking the average of ROI selections by a plurality of users of receivers that receive the transmitted difference image and downscaled input image.

In one embodiment, the residual image is created by non-uniformly upscaling the downscaled input image and subtracting the upscaled, downscaled input image from the original input image. In another embodiment, creation of the residual image further comprises encoding and decoding the downscaled input image before upscaling it and subtracting it from the original input image.

Other features and aspects of the disclosed method will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

The figures are not exhaustive and do not limit the disclosure to the precise form disclosed.

DETAILED DESCRIPTION

Figure 1:
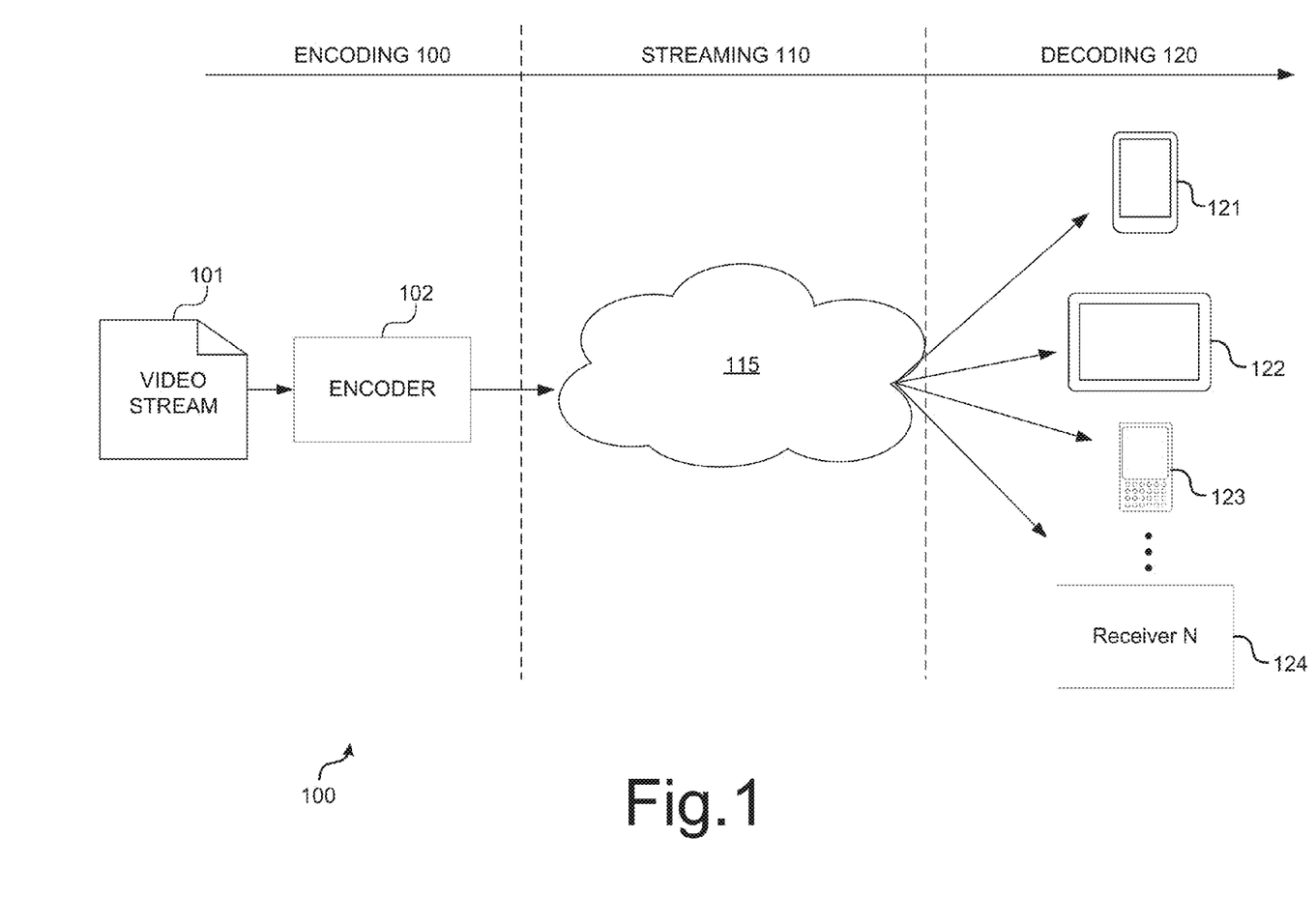
FIG. 1 illustrates a communications environment in accordance with the present disclosure.

FIG. 1 illustrates a communications environment in accordance with the present disclosure. In communications environment 100, video stream 101 is encoded (step 100) at an encoder 102 and then streamed (step 110) to receivers 121-124 over communications network 115. Encoder 102 may be communicatively coupled to a streaming server configured to stream the encoded video stream 101 over communications network 115. Receivers 121-124 are configured to decode (step 120) the received, encoded video stream for display. Receivers 121-124 may comprise any computing device (tablets, PDA's, smartphones, cellphones, palmtops, laptops, etc.), workstations or servers, or any other type of general-purpose computing device configured to receive and decode an encoded video stream.

Communications network 100 may include a cellular telephone network, an ad hoc network, an intranet, an extranet, a virtual private network (VPN), a local area network (LAN), a wireless LAN (WLAN), a wide area network (WAN), a portion of the Internet, a portion of the Public Switched Telephone Network (PSTN), or any combination thereof. Communication network 100 may use a number of communication mediums. The communication medium may be a wireless network system such as a cellular network, a wireless personal area network, a wireless local area network, or other similar communication medium. The communication medium may alternatively be a wired system, such as a coaxial cable system, a fiber optic cable system, an Ethernet cable system, or other similar communication medium.

Video stream 101 may comprise live content such as events—for example, concerts, sport events, and public presentations. A user of a mobile device receiver 121, for example, may subscribe to a mobile live video service provided by the organizer of a large concert, opera, or musical. The organizer could record multiple perspectives of the actors, singers, and band members, and provide live video streams over communication network 115 to the mobile devices of audience members. Alternatively, the video stream 101 may comprise camera footage at a live basketball game. The broadcaster could simultaneously record and stream multiple shots of different players and areas of the court. In yet another alternative, video stream 101 may comprise live camera footage shot by a movie production during filming that is then forwarded to responsible production team members in real time. On a production set, for example, the director, producers, assistants, or script supervisors can freely walk around on the set with a tablet 122 while freely checking the camera shot, the actors, and the scene from the camera's perspective. At castings, the video stream 101 can remotely be provided to executive managers unable to witness the casting on-site.

Given the high network bandwidth demanded by these scenarios, a high number of receivers 124 can dramatically reduce the individual video bit rate and video quality available per receiver 124. A high compression-high video quality encoding method with reduced sensitivity to data errors is desired. ROI coding techniques that prioritize specific regions in the streamed video are currently used. These ROI methods however, are strictly tied to a specific codec. Moreover, existing ROI methods are tied to specific shapes (e.g., rectangular ROI), rather than being able to have arbitrary ROI shapes.

Figure 2:
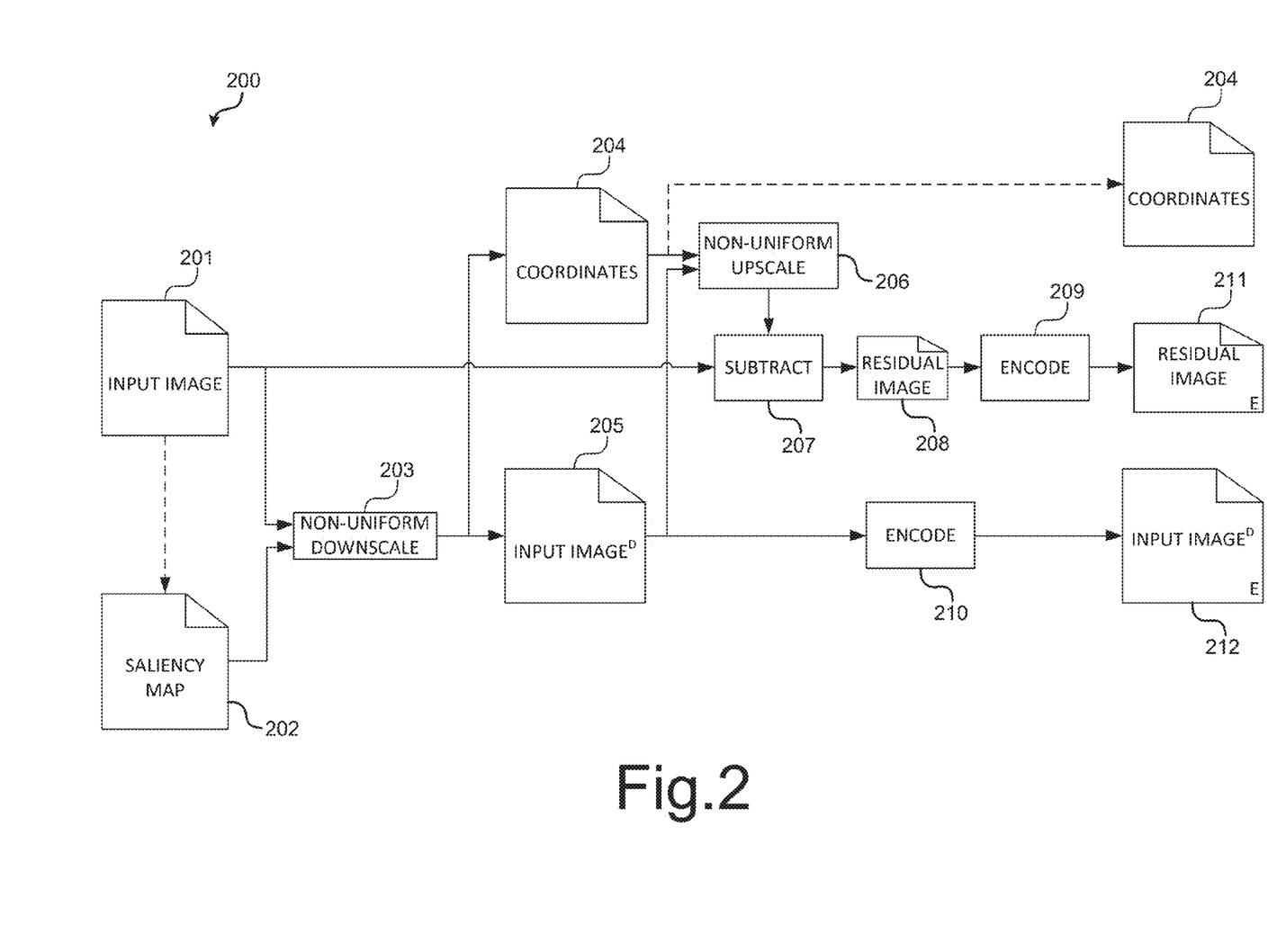
FIG. 2 illustrates a method of encoding video content by applying a saliency map to the original input image in the compression pipeline.

FIG. 2 illustrates an encoding method 200 that applies content-aware image compression using non-uniform saliency-driven image scaling. An input image (e.g., video frame) 201 is received at an encoder 102 for compression. As will be described below in further detail, the encoded output comprises three components: encoded downscaled input image 212, encoded residual image 211, and deformed grid coordinates 204.

As a first step, the input image is non-uniformly downscaled (step 203) based on a saliency map 202 of input image 201. During downscaling, more pixels are assigned to the more salient areas of the image. Saliency map 202 may be generated based on an algorithm specified by encoder 102. Alternatively, the user of a receiver 124 may provide saliency map 202 by selecting the ROI of the received video stream 101. For example, the user of tablet 122 or smartphone 121 could draw a saliency map directly onto the tablet or smartphone screen via touch gestures that select ROI. Any arbitrary saliency map may be applied during this downscaling step.

Figure 3A:
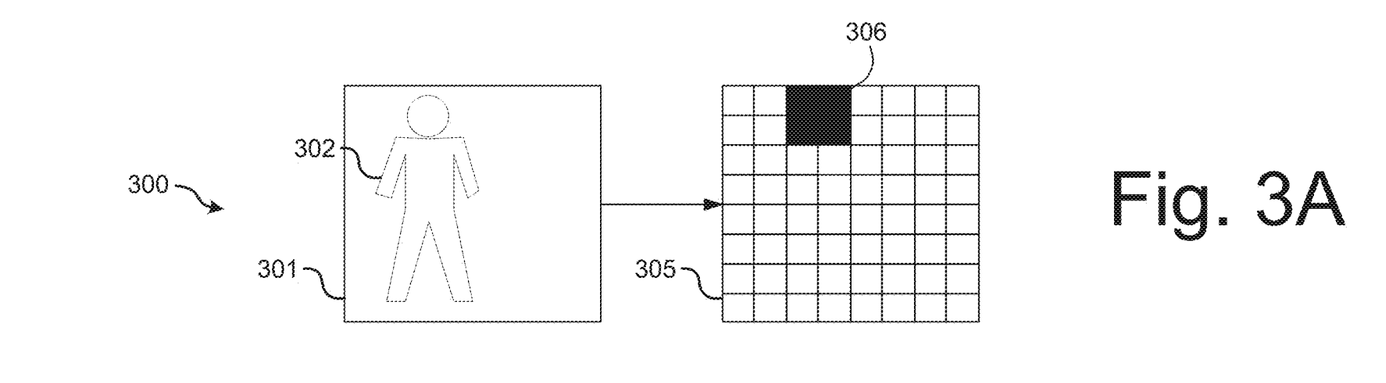
FIGS. 3A-B are block diagrams illustrating some exemplary saliency maps that can be used in the method of FIG. 2.
Figure 3B:
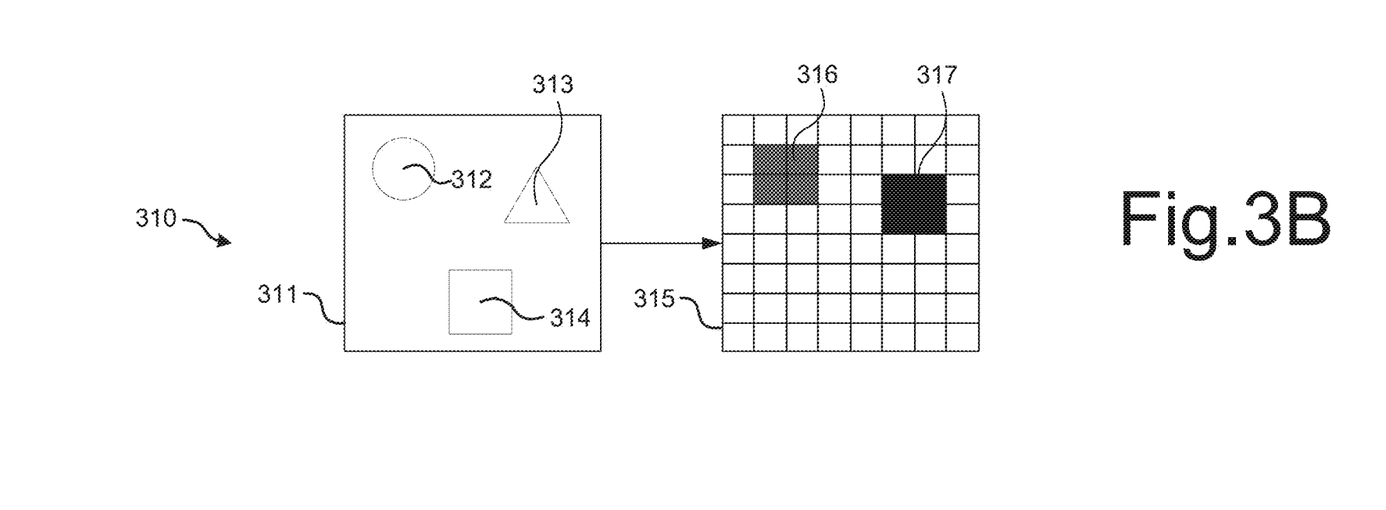

FIGS. 3A-3B illustrate two saliency maps. Saliency map 300, for example, computes a saliency map 305 of input image 301 by applying a facial recognition algorithm. The facial recognition algorithm detects person 302 and the generated saliency map assigns area 306, person 302's face, as the region of interest. Alternatively, saliency map 310 is generated by taking the average of ROI selections by a plurality of users of receivers 124 that receive input image 311. In this example, the majority of users select triangle 313, some select circle 312, and no users select square 314. The corresponding saliency map 315 non-uniformly assigns areas 316 and 317 as the ROI. That is, saliency map 315 assigns area 317 the most importance, followed by area 316, followed by the remainder of input image 311. In yet other implementations, saliency map 202 may be based on other algorithms that consider any number of factors in the streamed video such as the background (e.g., the back of a stage for a streamed concert may be less salient), the frequency of objects present in the video stream (e.g., the ball and player faces for a soccer match are more salient), image contrast (e.g., high contrast regions are more salient), or the visual attention system (i.e., tied to the behavior and neuronal architecture of the early primate visual system). As the preceding examples illustrate, encoder 102 may apply any arbitrary, non-uniform saliency map 202 to input image 201 during non-uniform downscaling (step 203).

In generating the downscaled input image 205 via non-uniform downscaling (step 203), encoder 102 may apply any image retargeting algorithm. In one embodiment, an axis-aligned retargeting algorithm, for example, may be applied as follows: A uniform grid is overlaid over input image 201 with N columns and M rows. By letting s be the desired scaling factor and W and H denote the width and height of input image 201, the target image width and height of the downscaled input image 205 can be denoted as $s_W$ and $s_H$. The axis-aligned deformed grid is computed by calculating the vector of unknowns $s=(s^{rows}, s^{cols})^T \in \mathbb{R}^{M+N}$ by solving the quadratic program written as Equation (1):

$$\text{minimize } s^T Q s + s^T b$$
$$\text{subject to } s_i^{rows} \geq L^h, i=1, \ldots, M,$$
$$s_j^{cols} \geq L^w, j=1, \ldots, N,$$
$$\sum_{i=1}^{M} s_i^{rows} = sH$$
$$\sum_{j=1}^{N} s_j^{cols} = sW$$

Where $s^{rows}$ and $s^{cols}$ are the vectors of unknown column heights and widths, respectively, $s_i^{rows}$ and $s_j^{cols}$ are the unknown column heights and widths, respectively, and $L^h$ and $L^w$ are the minimum row and column size of the deformed grid. $Q \in \mathbb{R}^{M+N} \times \mathbb{R}^{M+N}$ and $b \in \mathbb{R}^{M+N}$ are determined based on the two optimization energy equations (2) and (3):

$$E_{ASAP} = \sum_{i=1}^{M} \sum_{j=1}^{N} \left( \Omega_{i,j} \left( \frac{M}{H} s_i^{rows} - \frac{N}{W} s_j^{cols} \right) \right)^2 \quad (2)$$

$$E_{ARAP} = \sum_{i=1}^{M} \sum_{j=1}^{N} \Omega_{i,j}^2 \left( \left( \frac{M}{H} s_i^{rows} - 1 \right)^2 + \left( \frac{N}{W} s_j^{cols} - 1 \right)^2 \right) \quad (3)$$

Where ASAP is the As-Similar-As-Possible energy, ARAP is the As-Rigid-As-Possible energy, and $\Omega \in \mathbb{R}^{M+N}$ is the saliency matrix calculated by averaging the saliency map 202 inside every grid cell. After the axis-aligned deformed grid is computed, a bicubic interpolation is performed on original input image 201 according to the deformed grid to scale the image down to the new resolution. In other embodiments, the input image 205 may be downscaled by applying other interpolation algorithms such as bilinear interpolation or nearest-neighbor interpolation. The resultant downscaled input image 205 is saved along with deformed grid coordinates 204. In preparation for transmission to a receiver 124, Downscaled input image 205 is encoded (step 210) using an arbitrary image compression codec such as JPEG 2000, JPEG, PNG, or GIF. The compression may be lossy or losslessy depending on factors such as the available network bandwidth and the efficiency of the compression codec used.

Figure 4:
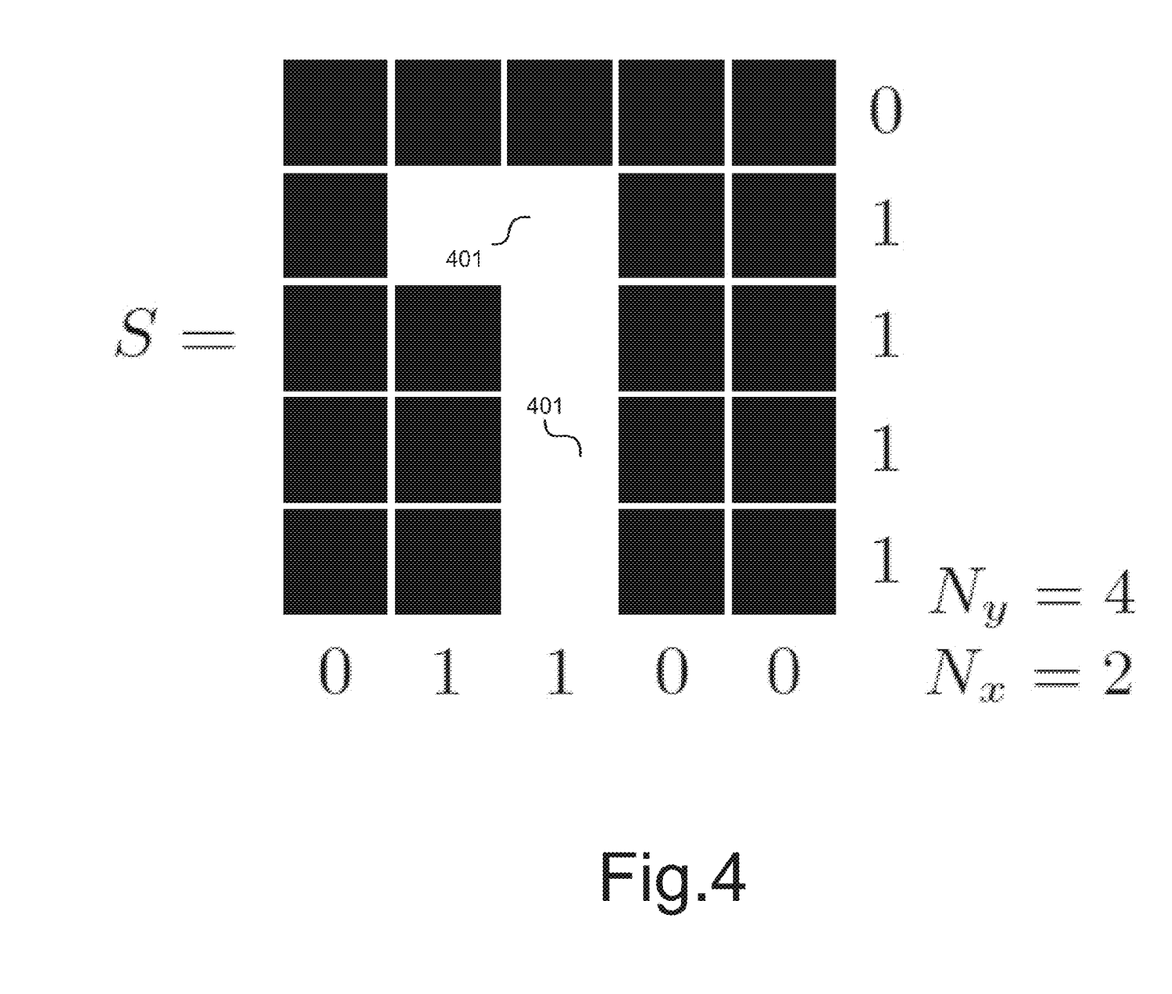
FIG. 4 illustrates calculating an aspect ratio from a saliency map for non-uniform downscaling.

In one embodiment, non-uniform downscaling (step 203) of input image 201 can be performed with a fixed aspect ratio. If downscaling (step 203) is performed using a fixed aspect ratio, the target width $w_d$ and height $h_d$ of the downscaled input image 205 are the width and height of input image 201 times the scaling factor s, i.e., $w_d=ws$ and $h_d=hs$. FIG. 4 illustrates another embodiment, where non-uniform downscaling (step 203) of input image 201 can be performed with an aspect ratio that is automatically calculated from the saliency map 202. In this implementation, the automatic aspect ratio width $w^*_d$ and height $h^*_d$ are calculated by counting the number of salient pixels 401 in the x-axis $N_x$ (i.e., the number of columns with at least one salient pixel), counting the number of salient pixels in the y-axis $N_y$ (i.e., the number of rows with at least one salient pixel), and then calculating equations (4) and (5):

$$s_x = \begin{cases} s & N_x > N_y \\ s\frac{N_y}{N_x} & \text{otherwise} \end{cases} \quad (4)$$

$$s_y = \begin{cases} s\frac{N_x}{N_y} & N_x > N_y \\ s & \text{otherwise} \end{cases} \quad (5)$$

Scaling factors $s_x$ and $s_y$ are conformed by enforcing that the number of pixels in an automatic aspect ratio downscaled image 205 is equal to the number of pixels in a fixed aspect ratio downscaled image 205 by applying conformation term $$p = \sqrt{\frac{s^2}{s_x^* s_y^*}}$$

where $s^*_x = s_x p$ and $s^*_y = s_y p$. The resultant target width $w^*_d$ and height $h^*_d$ for automatic aspect ratios can be written as equations (6) and (7):

$$w^*_d = w s_x p \quad (6)$$

$$h^*_d = h s_y p \quad (7)$$

To account for information loss that occurs during downscaling (step 203), a residual image 208 is computed by non-uniformly upscaling (step 206) downscaled input image 205 and subtracting it (step 207) from original input image 201. In this embodiment, the residual image 208 is determined according to the following equation (4):

$$D = \text{upscale}_C(\text{downscale}_C(I)) - I \quad (8)$$

Where D is the residual image 208, C are the deformed grid coordinates 204, and I is the original input image 201. Downscaled input image 205 is non-uniformly upscaled (step 206) based on the deformed grid coordinates 204. Upscaling may be performed by performing a bicubic interpolation on downscaled input image 205 according to deformed grid coordinates 204. In other embodiments, the downscaled input image may be upscaled by applying other interpolation algorithms such as bilinear interpolation or nearest-neighbor interpolation. In another embodiment, downscaled input image 205 may be encoded and decoded (not pictured) before upscaling it (step 206). In this embodiment, the residual image 208 is determined according to the following equation (9):

$$D = \text{upscale}_C(\text{codec\_dec}(\text{codec\_enc}(\text{downscale}_C(I)))) - I \quad (9)$$

Encoding and decoding may be performed by using an arbitrary image compression codec such as JPEG 2000, JPEG, PNG, or GIF. The compression may be lossy or losslessy depending on factors such as the available network bandwidth and the efficiency of the compression codec used. In another embodiment, encoding and decoding are performed using the same codec used to encode (step 210) downscaled input image 205.

Residual image 208 is encoded (step 209) in preparation for transmission to a receiver 124. Encoding and decoding may be performed by using an arbitrary image compression codec such as JPEG 2000, JPEG, PNG, or GIF. The compression may be lossy or losslessy depending on factors such as the available network bandwidth and the efficiency of the compression codec used. In another embodiment, encoding and decoding are performed using the same codec used to encode (step 210) downscaled input image 205.

In one embodiment, once the three encoding components, namely the encoded residual image 211, the encoded downscaled input image 212, and the deformed grid coordinates 204 are output by applying encoding method 200 to input image 201, encoder 102 streams the encoded components over communications network 115 to a receiver 124 for decoding and display. In another embodiment, a streaming server communicatively coupled to encoder 102 streams the encoded image components over communications network 115.

Figure 5:
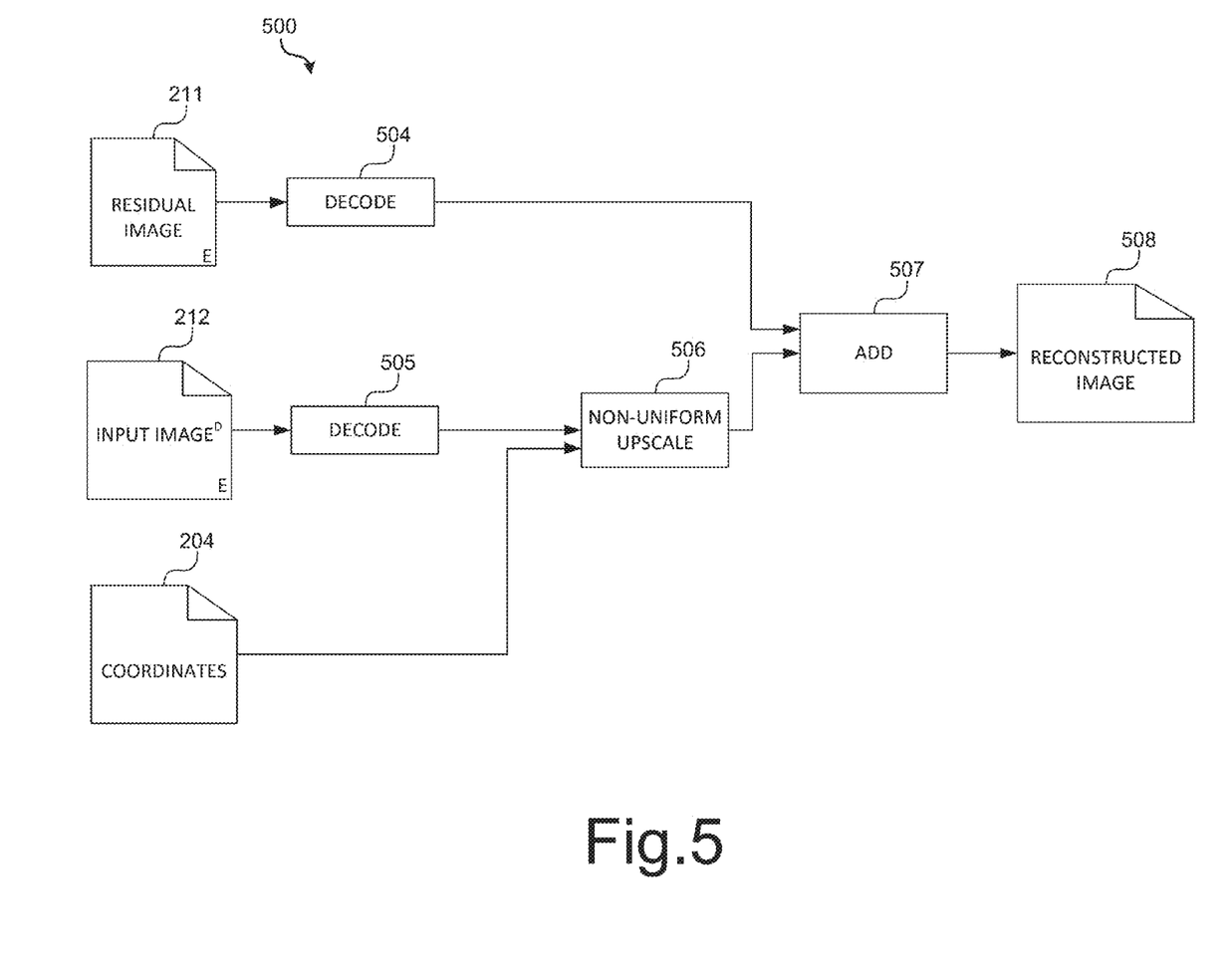
FIG. 5 illustrates a method of decoding video content encoded by the method of FIG. 2.

FIG. 5 illustrates a receiver side method 500 for decoding a residual image 211, a downscaled input image 212, and deformed grid coordinates 204 to create a reconstructed image 508 for display on a receiver 124. The encoded, downscaled input image 212 is decoded (step 505) using an arbitrary image compression codec such as JPEG 2000, JPEG, PNG, or GIF. In one embodiment, image 212 is decoded using the same compression codec that was used to encode it. The encoded residual image 211 is decoded at step 504. Like encoded image 212, encoded residual image 211 may be decoded using an arbitrary image compression codec such as JPEG 2000, JPEG, PNG, or GIF. In one embodiment, residual image 211 is decoded using the same compression codec that was used to encode it. In yet another embodiment, residual image 211 is decoded using the same codec use to decode image 212.

At step 506, the decoded, encoded, downscaled input image is non-uniformly upscaled based on deformed grid coordinates 204. In one embodiment, the downscaled input image may be upscaled by performing a bicubic interpolation based on the deformed grid coordinates 204. In other embodiments, the downscaled input image may be upscaled by applying other interpolation algorithms such as bilinear interpolation or nearest-neighbor interpolation. At step 507, the reconstructed image 508 is computed by adding upscaled image to the decoded residual image. In some embodiments, the reconstructed image 508 is a perfect reconstruction of input image 201. This decoding method 500 may be repeated for a plurality of received encoded image components.

Figure 6:
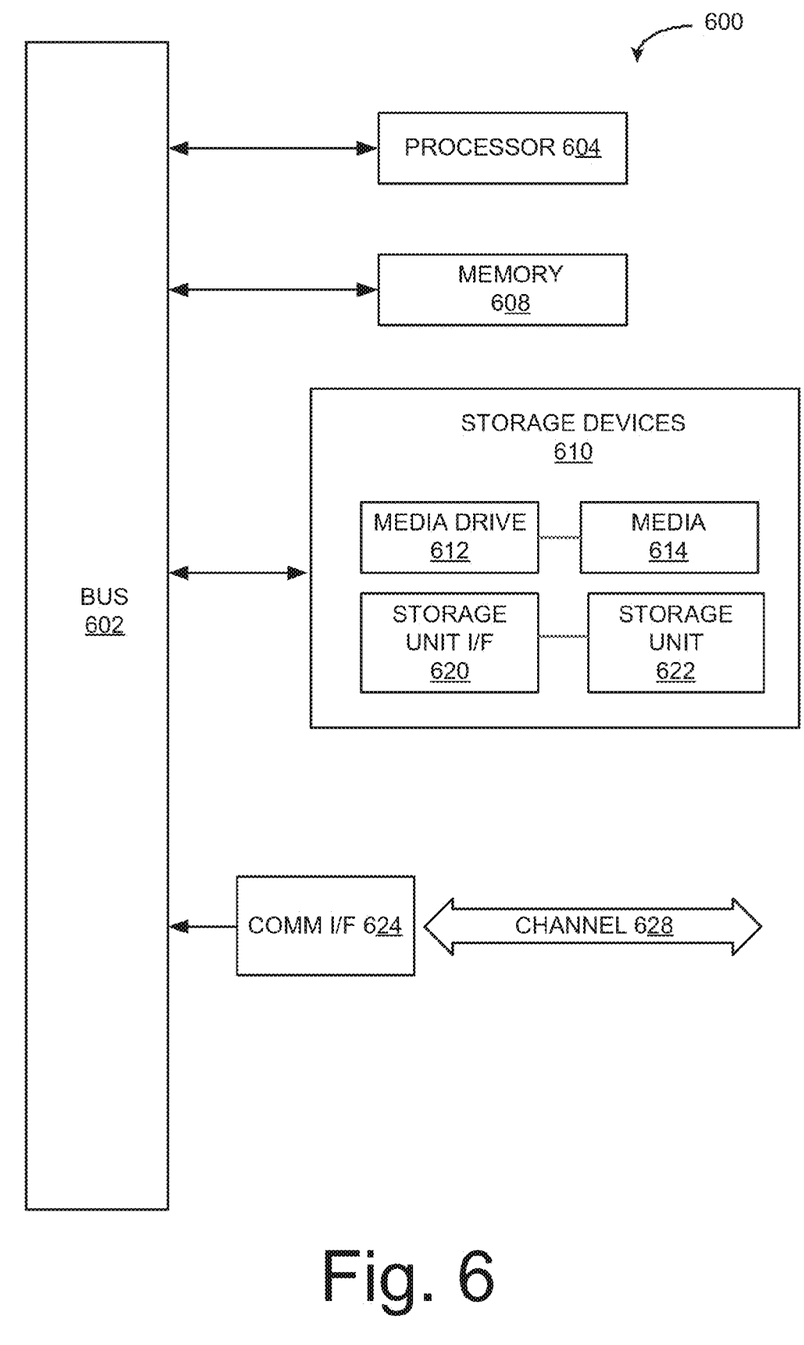
FIG. 6 illustrates an example computing module that may be used to implement various features of the methods disclosed herein.

FIG. 6 illustrates an example computing module that may be used to implement various features of the methods disclosed herein.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 6. Various embodiments are described in terms of this example-computing module 600. After reading this description, it will become apparent to a person skilled in the relevant art how to implement the application using other computing modules or architectures.

Referring now to FIG. 6, computing module 600 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 600 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 600 might include, for example, one or more processors, controllers, control modules, or other processing devices, such as a processor 604. Processor 604 might be implemented using a general-purpose or special-purpose processing engine such as, for example, a microprocessor, controller, or other control logic. In the illustrated example, processor 604 is connected to a bus 602, although any communication medium can be used to facilitate interaction with other components of computing module 600 or to communicate externally.

Computing module 600 might also include one or more memory modules, simply referred to herein as main memory 608. For example, preferably random access memory (RAM) or other dynamic memory, might be used for storing information and instructions to be executed by processor 604. Main memory 608 might also be used for storing temporary variables or other intermediate information during execution of instructions to be executed by processor 604. Computing module 600 might likewise include a read only memory ("ROM") or other static storage device coupled to bus 602 for storing static information and instructions for processor 604.

The computing module 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a floppy disk drive, a magnetic tape drive, an optical disk drive, a CD or DVD drive (R or RW), or other removable or fixed media drive might be provided. Accordingly, storage media 614 might include, for example, a hard disk, a floppy disk, magnetic tape, cartridge, optical disk, a CD or DVD, or other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing module 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory module) and memory slot, a PCMCIA slot and card, and other fixed or removable storage units 622 and interfaces 620 that allow software and data to be transferred from the storage unit 622 to computing module 600.

Computing module 600 might also include a communications interface 624. Communications interface 624 might be used to allow software and data to be transferred between computing module 600 and external devices. Examples of communications interface 624 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 600 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method, comprising:
   non-uniformly downscaling an original input image according to a saliency map, wherein a deformed grid is computed based on the saliency map and used to non-uniformly downscale the original input image;
   creating a residual image using the original input image and the downscaled input image;
   encoding the downscaled input image to produce an encoded downscaled input image; and
   transmitting the encoded residual image, the deformed grid coordinates, and the encoded downscaled input image;
   wherein the non-uniform downscaling is performed with a non-uniform aspect ratio by performing the operations of:
      determining a number of columns of the saliency map with at least one salient pixel;
      determining a number of rows of the saliency map with at least one salient pixel; and
      determining the non-uniform aspect ratio by computing a x-axis scaling factor and a y-axis scaling factor based on the number of columns with at least one salient pixel and the number of rows with at least one salient pixel.

2. The method of claim 1, wherein non-uniformly downscaling an original input image comprises:
   overlaying a uniform grid over the original input image;
   computing an axis-aligned deformed grid based on the saliency map; and
   performing a bicubic interpolation on the original input image based on the deformed grid coordinates.

3. The method of claim 2 wherein the saliency map is based on an algorithm specified by an encoder or streaming server.

4. The method of claim 2 wherein the saliency map is not based on a rectangular region of interest in the original input image.

5. The method of claim 4 wherein the saliency map is calculated based on a user selecting a region of interest of a received video stream.

6. The method of claim 2, wherein the non-uniform downscaling is performed with a non-uniform aspect ratio based on the distribution of the saliency region of the original input image.

7. The method of claim 1 wherein the encoding and decoding steps are performed using the JPEG 2000 image encoder.

8. The method of claim 1, wherein non-uniformly upscaling the downscaled input image comprises performing a bicubic interpolation on the downscaled input image based on the deformed grid's coordinates.

9. The method of claim 1, wherein the x axis scaling factor ($s_x$) and the y axis scaling factor ($s_y$) are determined based on:

$$s_x = \begin{cases} s & N_x > N_y \\ s\frac{N_y}{N_x} & \text{otherwise} \end{cases} \text{ and } s_y = \begin{cases} s\frac{N_x}{N_y} & N_x > N_y \\ s & \text{otherwise} \end{cases}$$

wherein s is a scaling factor for downscaling the input image with a fixed aspect ratio, w is a width of the input image, h is a height of the input image, $N_x$ is the number of counted columns with at least one salient pixel, and $N_y$ is the number of counted rows with at least one salient pixel.

10. The method of claim 9, wherein the x-axis scaling factor and the y-axis scaling factor are conformed by enforcing that a number of pixels in the non-uniformly downscaled input image is equal to a number of pixels in a fixed aspect ratio downscaled version of the original input image.

11. A method, comprising:
   receiving an encoded residual image, deformed grid coordinates, and an encoded downscaled input image;
   decoding the encoded downscaled input image;
   non-uniformly upscaling the decoded, encoded, and downscaled input image based on the deformed grid coordinates;
   decoding the encoded residual image; and
   adding the decoded residual image to the upscaled input image to obtain a reconstructed image;
   wherein the decoded downscaled input image was non-uniformly downscaled with a non-uniform aspect ratio at an encoder by performing the operations of:
      determining a number of columns of a saliency map corresponding to the deformed grid coordinates with at least one salient pixel;
      determining a number of rows of the saliency map with at least one salient pixel; and
      determining the non-uniform aspect ratio by computing a x-axis scaling factor and a y-axis scaling factor based on the number of columns with at least one salient pixel and the number of rows with at least one salient pixel.

12. The method of claim 11 wherein non-uniformly upscaling the downscaled input image comprises performing a bicubic interpolation on the downscaled input image based on a set of deformed grid coordinates;
   wherein the deformed grid coordinates are generated by non-uniformly downscaling an input imaged based on a saliency map.

13. A non-transitory computer readable medium having computer executable program code embodied thereon, the computer executable program code configured to cause a computing device to:
   non-uniformly downscale an original input image according to a saliency map, wherein a deformed grid is computed based on the saliency map and used to non-uniformly downscale the original input image;
   create a residual image using the original input image and the downscaled input image;
   encode the downscaled input image to produce an encoded downscaled input image; and
   transmit the encoded residual image, the deformed grid coordinates, and the encoded downscaled input image over a networks;
   wherein the non-uniform downscaling is performed with a non-uniform aspect ratio by performing the operations of:
      determining a number of columns of the saliency map with at least one salient pixel;
      determining a number of rows of the saliency map with at least one salient pixel; and
      determining the non-uniform aspect ratio by computing a x-axis scaling factor and a y-axis scaling factor based on the number of columns with at least one salient pixel and the number of rows with at least one salient pixel.

14. The computer readable medium of claim 13, wherein the original input image is non-uniformly downscaled according to a saliency map by:
   overlaying a uniform grid over the original input image;
   computing an axis-aligned deformed grid based on the saliency map; and
   performing a bicubic interpolation on the original input image based on the deformed grid coordinates.

15. The computer readable medium of claim 14 wherein the saliency map is based on an algorithm specified by an encoder or streaming server.

16. The computer readable medium of claim 14 wherein the saliency map is not based on a rectangular region of interest in the original input image.

17. The computer readable medium of claim 16 wherein the saliency map is calculated based on a user selecting a region of interest of a received video stream.

18. The computer readable medium of claim 14, wherein the original input image is non-uniformly downscaled according to a non-uniform aspect ratio based on the distribution of the saliency region of the original input image.

19. The computer readable medium of claim 13 wherein the encoding and decoding steps are performed using the JPEG 2000 image encoder.

20. The computer readable medium of claim 13, wherein the downscaled input image is non-uniformly upscaled by performing a bicubic interpolation on the downscaled input image based on the deformed grid's coordinates.

21. A non-transitory computer readable medium having computer executable program code embodied thereon, the computer executable program code configured to cause a computing device to:

receive an encoded residual image, deformed grid coordinates, and an encoded downscaled input image over a network;

decode the encoded downscaled input image;

non-uniformly upscale the decoded, encoded, and downscaled input image based on the deformed grid coordinates;

decode the encoded residual image; and add the decoded residual image to the upscaled input image to obtain a reconstructed image;

wherein the decoded downscaled input image was non-uniformly downscaled with a non-uniform aspect ratio at an encoder by performing the operations of:

determining a number of columns of a saliency map corresponding to the deformed grid coordinates with at least one salient pixel;

determining a number of rows of the saliency map with at least one salient pixel; and determining the non-uniform aspect ratio by computing a x-axis scaling factor and a y-axis scaling factor based on the number of columns with at least one salient pixel and the number of rows with at least one salient pixel.

22. The computer readable medium of claim 21 wherein the downscaled input image is non-uniformly upscaled by performing a bicubic interpolation on the downscaled input image based on a set of deformed grid coordinates;

wherein the deformed grid coordinates are generated by non-uniformly downscaling an input imaged based on a saliency map.

* * * * *

UNITED STATES PATENT AND TRADEMARK OFFICE
CERTIFICATE OF CORRECTION

PATENT NO.         : 9,324,161 B2                                    Page 1 of 1
APPLICATION NO.    : 13/802165
DATED              : April 26, 2016
INVENTOR(S)        : Zund et al.

It is certified that error appears in the above-identified patent and that said Letters Patent is hereby corrected as shown below:

In the Claims

Column 12, line 23:    "networks" should be -- network --.

Signed and Sealed this
Fourteenth Day of June, 2016

Michelle K. Lee
*Director of the United States Patent and Trademark Office*